July 22, 1941. C. R. HANNA 2,249,826
REGULATING APPARATUS
Filed Jan. 12, 1939 2 Sheets-Sheet 1

WITNESSES:
E. A. McCloskey
Neil C. Groome

INVENTOR
Clinton R. Hanna.
BY Franklin E. Hardy
ATTORNEY

July 22, 1941.  C. R. HANNA  2,249,826
REGULATING APPARATUS
Filed Jan. 12, 1939  2 Sheets-Sheet 2
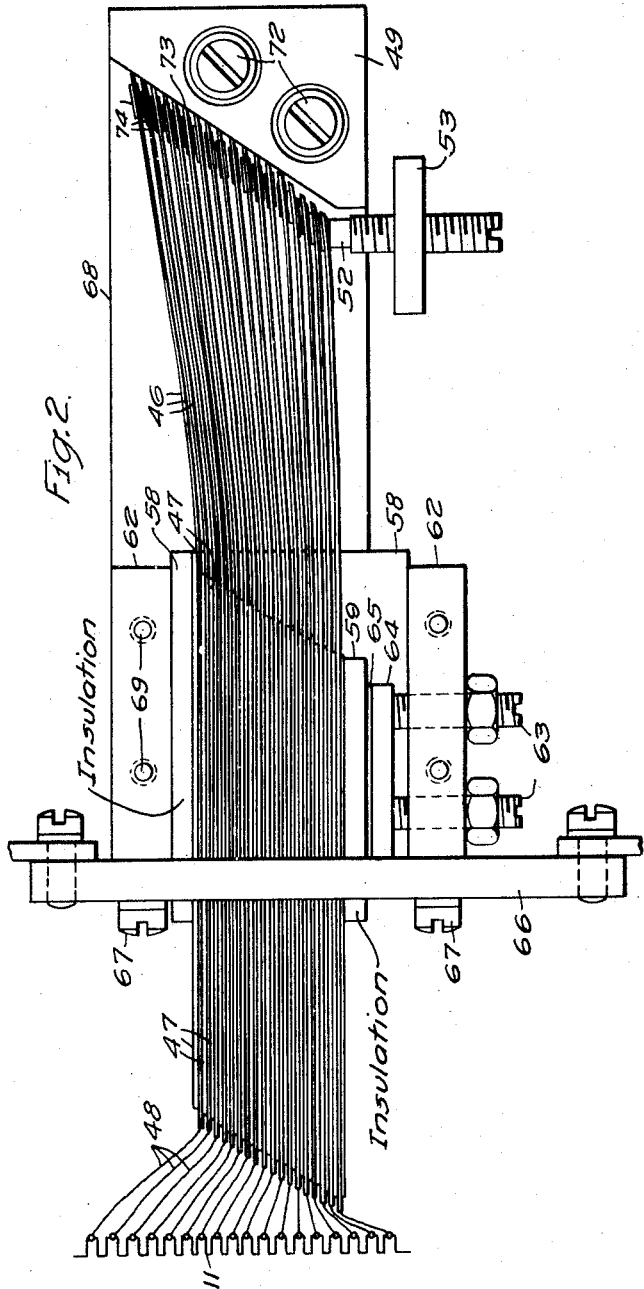
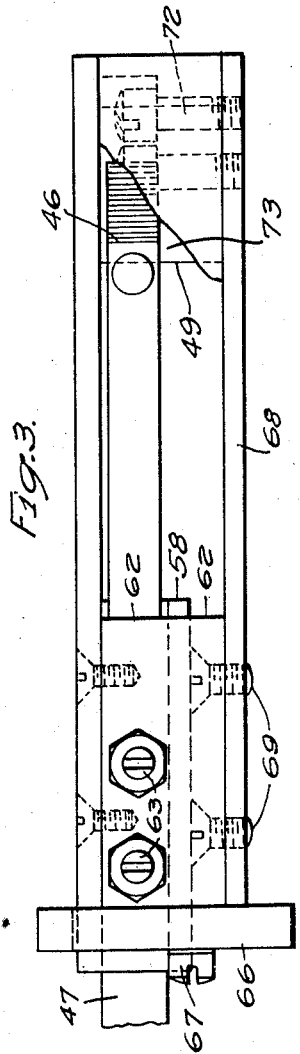
INVENTOR
Clinton R. Hanna.
BY Franklin E. Hardy
ATTORNEY Patented July 22, 1941

2,249,826

UNITED STATES PATENT OFFICE 2,249,826

REGULATING APPARATUS

Clinton R. Hanna, Pittsburgh, Pa., assignor to Westinghouse Electric & Manufacturing Company, East Pittsburgh, Pa., a corporation of Pennsylvania Application January 12, 1939, Serial No. 250,535

7 Claims. (Cl. 171—229)

My invention relates to regulating apparatus and particularly to regulators of the rheostatic type such as are effective for controlling the field winding of dynamo-electric machines.

It is an object of my invention to provide a regulator system employing a regulator of the rheostatic type for controlling the excitation of dynamo-electric machines that require a small amount of energy to operate, and in which the rheostat controlling element is movable through a small range of travel for effecting a large correction in the regulated quantity.

A further object of the invention is the provision of a regulator system in which a plurality of automatic rheostatic devices of the multiple contact type are employed as power amplifiers for controlling a circuit for adjusting a regulated quantity, and which devices are controlled by a similar rheostatic device acting as a pilot element that is sensitive to the regulated quantity.

Other objects and advantages of my invention will be apparent from the following description of one preferred embodiment of the invention, reference being had to the accompanying drawings, in which:

Fig. 2 is a plan view of the leaf-spring assembly constituting a part of the automatic rheostatic devices employed, and Fig. 3 is a side view of the leaf-spring assembly showing a portion thereof cut away.

Figure 1:
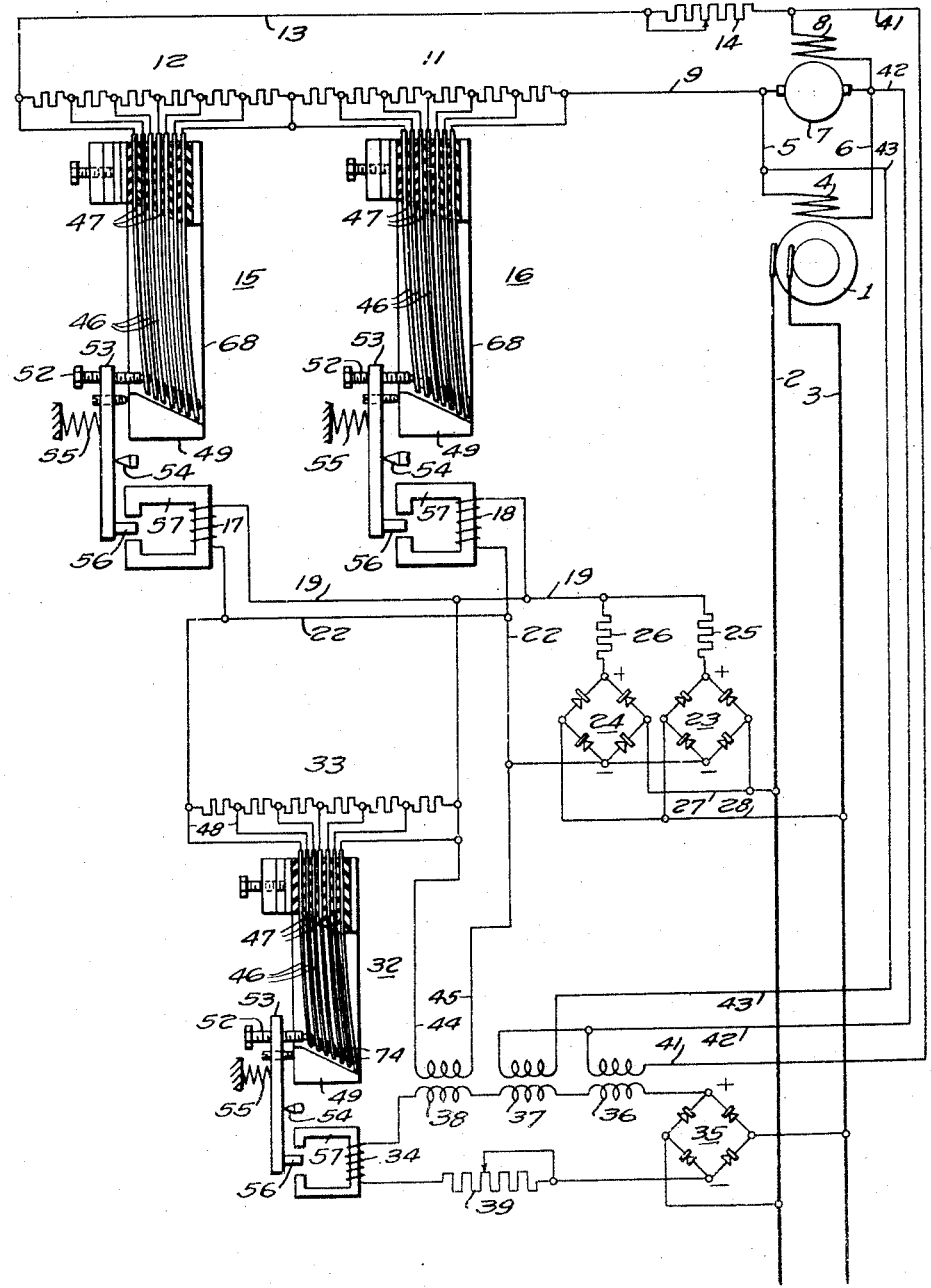
Figure 1 is a diagrammatic view of apparatus and circuits organized in accordance with the invention.

Referring to Figure 1 of the drawings, a regulating system is illustrated for controlling the voltage of a generator having an armature 1 connected to supply circuit conductors 2 and 3 and a field circuit 4 connected to be supplied with energy through conductors 5 and 6 from the armatures 7 of an exciter generator having a field winding 8 connected to be energized from the exciter armature 7 through a circuit including conductor 9, resistors 11 and 12, conductor 13, and field adjusting rheostat 14. Two automatic rheostatic control elements 15 and 16 of the multiple leaf-spring type are provided for controlling resistors 11 and 12, respectively, in accordance with variations in the energization of their respective actuating windings 17 and 18 that are supplied with energy through conductors 19 and 22 from full-wave rectifiers 23 and 24, the unidirectional or output side of which are connected through resistors 25 and 26, respectively, and the alternating or input side of which are supplied with energy through conductors 27 and 28 from circuit conductors 2 and 3.

A third automatic rheostatic device 32 is provided for controlling the effective value of a resistor 33 connected between conductors 19 and 22 in shunt relation to the windings 17 and 18 that control the operation of devices 15 and 16, respectively. The rheostat devices 15 and 16 may be of larger current-carrying capacity than the device 32, and operate as power amplifying units controlled by the pilot unit 32 that is actuated in accordance with the energization of a winding 34 supplied with unidirectional energy from the full-wave rectifier 35 at a voltage that is a measure of the voltage of the regulated circuit 2, 3.

The output or unidirectional current side of the rectifier 35 is connected to the winding 34 through a circuit including the secondary windings of transformers 36, 37 and 38 and a voltage adjusting rheostat 39. The primary winding of the transformer 36 is connected by conductors 41 and 42 to be supplied with voltage corresponding to the voltage across the field winding 8 of the exciter generator. The primary winding of the transformer 37 is connected by conductors 42 and 43 to be supplied with current at a voltage corresponding to the voltage across the field winding 4 of the main generator, and the primary winding of transformer 38 is connected by conductors 44 and 45 to be supplied with current at a voltage corresponding to the voltage across the actuating coils 17 and 18 of the rheostat units 15 and 16.

The leaf-spring assembly of the units 15, 16 and 32 may correspond to the construction disclosed in copending application of C. R. Hanna et al., Serial No. 203,876, filed April 23, 1938, for Regulators, and assigned to the same assignee as this application.

The leaf-spring assembly is best shown in Figs. 2 and 3, and includes a plurality of leaf springs 46 arranged in a stack having their fixed ends insulated from each other by layers of fishpaper 47 and connected by conductors 48 to a plurality of points along the associated resistor 11, 12 or 33. The opposite ends of the leaf springs 46 are free to move and are biased into engagement with a stop 49 of insulating material for limiting their motion in one direction, and for spacing the free ends of the spring elements 46 out of circuit closing engagement with one another, except when moved from engagement with the stop by a driving member 52 carried on a moving arm 53 that is actuated in accordance with the energization of the actuating winding of the rheostat device unit.

The arrangement of the magnet structure for mounting and actuating the movable arm 53 may correspond to that disclosed in copending application of Ralph A. Geiselman, Serial No. 219,527, filed July 16, 1938, for Regulators, and assigned to the same assignee as this application. This structure is diagrammatically illustrated in Fig. 1 as providing a pivot 54 about which the lever arm 53 is adapted to move against the bias of a spring 55 in accordance with the force exerted on an armature 56 of magnetic material carried by the arm and positioned within an air gap in the stationary core portion 57 of a magnetic circuit energized by a winding 17, 18 or 34 for actuating the associated rheostatic device.

Referring to Figs. 2 and 3, the plurality of individual leaf springs 46 are insulated from adjacent springs by layers of fishpaper 47 spaced between adjacent leaf springs and which are wider than the springs. The fixed or clamped portions of the stack of leaf springs are positioned between an upturned flange portion of an insulating member 58 and an insulating member 59, and these parts are positioned within a channel-shaped bracket 62 in which the stack is fastened by means of set screws 63 extending through bores in one wall of the bracket 62. A portion of the member 58 also extends along the edge of the stack beneath the leaf springs, as viewed in Fig. 2. The inner ends of the set screws 63 engage a plate 64 between which and the insulating plate 59, a spring 65 is provided. In its clamped position, the spring 65 is substantially straight, but is biased by an initial curve to urge the clamping plate 64 and the insulating plate 59 away from each other.

The assembly is mounted on the plate 66 by means of screws 67 extending therethrough and into bores in the end of the bracket 62. A plate 68 is provided that is attached by screws 69 to the under-side of the bracket 62, as viewed in Fig. 3, and to the outer end of which the stop block 49 is attached by means of screws 72. The screws 72 extend through openings in the block 49 which are large enough to permit a certain amount of angular movement of the block 49 so as to shift the angle of the contact surface 73 against which the outer ends of the several leaf springs 46 engage. The block 49 is so positioned with respect to the ends of the several leaf springs 46 that they are brought against the surface 73 with a slight loading or biasing force and are accurately spaced from one another at their free ends regardless of a lack of straightness of the individual leaves 46. This spacing may be adjusted by angular movement of the block 49 within the limits permitted by the screws 72. When the block 49 is moved so that the surface 73 is shifted in a counter-clockwise direction, as viewed in Fig. 2, the spacing of the members 46 will be increased, and when moved in the opposite direction, the spacing of the members 46 will be decreased.

Each of the individual leaf springs 46, which may be of bronze, carry silver buttons 74 adjacent the outer free ends thereof through which a circuit may be completed between adjacent leaf springs when so biased as to bring the contact members or buttons 74 carried by adjacent leaf springs into engagement. It will be noted that the leaf springs 46 are so arranged in the stack that the slope of their free ends is substantially in alignment with the surface 73 of the block 49 when the silver buttons 74 are out of engagement with one another.

It will be noted that the employment of the sloping surface 73 of the block 49 as a stop for spacing the members 46 permits the use of a large number of spring members 46 in a small space, since the required space between adjacent leaf springs is small and may be accurately controlled. This arrangement permits a free unrestricted movement of the members 46 in a direction from the block 49 which does not exist where individual stops were provided between the several members. The close spacing of the members also results in a rheostat having a large number of steps controlled by a slight movement of the driving member. The resistance steps are so proportioned that the resistance and energy values between any two adjacent spring members 46 are kept low in magnitude. This avoids injurious burning or damage to the surface of the silver buttons 74.

The operation of the regulator system here disclosed is as follows: When the voltage of the generator is low, as when starting, the several leaf springs 46 of the pilot rheostat unit 32 will be raised from engagement with the block 49 of that unit by the force of the spring 55 acting through the lever 53 and the driving member 52, thus bringing the silver buttons 74 of the entire stack into engagement to short circuit the resistor 33. The short circuited resistor 33 prevents voltage from building up on the windings 17 and 18 of the amplifier units 15 and 16 so that the leaf springs 46 of these units will be similarly urged away from their respective blocks 49 by their associated springs 55 to short circuit the resistors 12 and 11, respectively. This will cause a maximum rate of build-up of the voltage of the exciter generator 7 and of the main generator 1 supplying the output circuit 2, 3. As the voltage between conductors 2 and 3 increases to the desired value, the force on the armature 56 of the pilot unit 32 correspondingly increases causing the arm 53 to move in a counter-clockwise direction and the driving member 52 to move toward the left, as viewed in Fig. 1, to permit a number of the springs 46 to engage the stop block 49. After each successive spring 46 engages the block 49, and the next adjacent spring continues to move toward the left, the silver buttons 74 carried by the members 46 separate and interrupt the short circuit about the successive portions of the resistor 33 from the right toward the left to raise the voltage on the windings 17 and 18 of the amplifier units 15 and 16, respectively. The increase in the energization of the windings 17 and 18 of units 15 and 16 effects operation of these units similar to that described for the pilot unit 32, causing movement of the driving members 52 of units 15 and 16 toward the left, as viewed in Fig. 1, to introduce successive portions of the resistors 11 and 12 into the field winding circuit of the exciter generator 7. At the desired voltage value, the pull on the armature 56 of the pilot rheostat unit 32 just balances the force of the spring 55 effecting some intermediate value of the resistor 33 determined by the number of portions thereof that are short-circuited.

If the voltage between circuit conductors 2, 3 increases, the pull on the armature 56 of the pilot unit 32 increases, thus moving the driving member 52 against the bias of the spring 55 to permit a larger number of buttons 74 to be separated upon engagement of their associated individual leaf springs 46 with the surface 73 of the stop block 49, thus removing the short circuits between a greater number of successive portions of the resistor 33 to cause an increase in the voltage applied to the windings 17 and 18 of the amplifier units 15 and 16 and an operation thereof corresponding in character to that of the pilot unit 32. Correspondingly, if the voltage between conductors 2, 3 decreases, the pull on the armature 56 of the pilot unit 32 decreases, permitting the force on the spring 55 to move the driving member 52 toward the right to raise a larger number of springs 46 from engagement with the block 49 and bring their associated silver contact buttons 74 into engagement with the corresponding buttons carried by adjacent leaf springs to thereby short circuit an increasing number of portions of the resistor 33 and cause a decrease in the voltage applied to windings 17 and 18 of the units 15 and 16. This effects corresponding operations of the amplifier units 15 and 16 to increase the excitation of the field winding 8 of the exciter generator 7 and of the main generator 1.

When the voltage is restored to its normal value after a variation therefrom, the magnetic pull on the armatures 56 balances the pull of the springs 55 of the pilot unit 32, and also of the amplifier units 15 and 16, and the moving arm 53 and driving member 52 of each unit will have changed their positions sufficiently to effect the necessary change in the desired number of sections of resistors 12 and 11 connected in the field circuit of the exciter generator. It will be apparent that the regulating action is that of a semi-static regulator, and operates only when a correction in voltage is necessary. So long as the circuit conditions remain unchanged and the required excitation remains constant, the position of the moving arm 53 of the pilot arm 32 will remain unchanged, as will also the positions of the moving arms 53 of the amplifier units 15 and 16. A very small percentage change in the energization of the actuating winding 34 of the pilot unit 32 will cause that unit to effect a substantial change in the value of resistance connected in shunt relation to the actuating windings 17 and 18 of the amplifier units 15 and 16, so that the change in voltage across the windings 17 and 18 and the power available for actuating the amplifier units 15 and 16, is substantial. The entire voltage range from the voltage of the supply to a complete short circuit of the windings 17 and 18 is thus effected upon a relatively small percentage change in the energization of the actuating winding 34 of the pilot unit. If desired, the windings 17 and 18 of the amplifying units 15 and 16 may be so adjusted that these two units will operate from zero resistance to the full resistance of resistors 11 and 12 throughout different ranges in voltages applied to their actuating winding 17 and 18. By this means the several sections of resistors 11 and 12 may be introduced or shunted from the field winding circuit in sequence as though the several sections of both resistors 11 and 12 were controlled by a single resistor unit. The series connection of the resistors 11 and 12 allows the watt rating of the regulator to be increased, whether this change results in a current or voltage increase, because the larger number of resistance steps in the field winding permits a lower value of resistance in each step to keep the I²R rating per step within safe limits.

The several feedback transformers 36, 37 and 38, having their secondary windings in the circuit energizing the actuating winding 34 of the pilot rheostatic device 32, introduce a stabilizing and anti-hunting influence to compensate for the time delays introduced by the pilot element 32, the amplifier elements 15 and 16 and the exciter field 8, respectively. It will be noted that the primary windings of each of these transformers are connected to unidirectional sources of energy supply, so that when the voltages of these several sources are constant no voltage components are introduced into the circuit of the actuating winding 34. When, however, the voltage on the windings 34 changes in the one or the other direction to effect a change in the voltage of the main generator 1, voltage components are introduced in a direction to anticipate the resulting change, and at time intervals responsive, respectively, to the result of the operation of the pilot element 32 on the voltage applied to the actuating windings 17 and 18 of the amplifying units, the voltage applied to the exciter field winding 8, and the voltage applied to the main generator field winding 4. Proper design of the transformers, not only eliminates hunting action, but also provides the desired damping effect to the system resulting from the sequential operation of the several elements thereof necessary to effect a correction in the regulated voltage between the time that the corrective impulse is initiated and the final correction made.

In the pilot element 32, and also in the amplifier elements 15 and 16, the leaf springs 46 are so arranged that the springs 55 close the circuit through the contact members 74 carried thereby and the magnetic force of the actuating coils 32, 17 and 18, respectively, interrupt these circuits. This makes the regulating action self-starting when the exciter and generator are brought up to voltage. In the pilot element 32, the leaf springs 46 are relatively small so that the spring 55 opposes most of the force of the magnetic pull, making this unit highly sensitive to slight changes in the energization of the winding 34. In the amplifier units 15 and 16, the leaf springs 46 are larger in order to control a larger value of current, and the total spring force of a stack is greater than in the case of the pilot unit 32. The force of the springs 55 may, however, be substantially the same in the amplifier units as in the pilot unit because the somewhat greater accumulated force resulting from the loading of the leaf-spring stack is comparatively small and this greater percentage variation in the loading of the leaf springs is more than overcome by the greater percentage voltage variation on the actuating windings 17 and 18 of the amplifier units than on the actuating winding 34 of the pilot unit 32. Inasmuch as it is unnecessary to design the amplifier units 15 and 16 to provide that they operate through the complete range in resistor values with a small percentage variation in voltage that is required of the pilot unit 32, the same size coil and magnetic structure may often be employed in the amplifier units as in the pilot unit.

It will be noted that both the pilot unit 32 and the amplifier units 15 and 16 are very quick in operation, since the moving parts are substantially frictionless, and the effect of the inertia of these parts is very small because of the very slight movement of the driving member required to operate the associated rheostat throughout its complete range.

It will be apparent to those skilled in the art that modifications in the circuits and details of construction disclosed may be made within the spirit of my invention, and I do not wish to be limited otherwise than by the scope of the appended claims.

I claim as my invention:

1. In a regulator system, in combination, a plurality of power amplifying devices each comprising a resistor, a plurality of circuit controlling members arranged in a stack with corresponding ends supported in fixed relation and connected to separate points along the resistor, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, and electro-responsive means for actuating said circuit controlling members from engagement with the stop and into circuit closing engagement with the adjacent members to short circuit selected portions of the associated resistor, a source of energy for supplying said electro-responsive means, and means for adjusting the energization of the electro-responsive means of said power amplifying devices comprising a similar device the actuating means of which is sensitive to the quantity being regulated.

2. In a regulator system, means for regulating an electrical quantity comprising, in combination, a circuit, a plurality of power amplifying devices each having a resistor included in the circuit, and each comprising a plurality of contact members connected to separate points along said resistor, stop means for spacing the contact members when engaged thereby, said stop means being arranged to permit unlimited movement of the contact members away from the stop means, means for biasing said contact members to the positions limited by the stop means, and electro-responsive means actuated for moving said contact members from engagement with the stop to successively short circuit portions of the resistor, and a pilot circuit controlling device sensitive to the regulated quantity for governing said amplifying power devices.

3. In a regulator system, means for adjusting a characteristic of an electric circuit comprising, in combination, a plurality of automatic rheostatic devices each comprising a resistor, a plurality of contact members connected to separate points along said resistor, stop means for spacing of the contact members relative to adjacent contact members, the relative movement between said contact members and said stop means being unrestricted in one direction, and electro-responsively controlled means including an energizing winding for effecting the relative movement of said contact members and said stop means in the unrestricted direction, certain of said rheostatic devices being arranged as power amplifying devices for adjusting said electric characteristic, and one of said rheostatic devices being connected as a pilot element sensitive to the regulated quantity for controlling said power amplifying devices.

4. In a regulating system, a main electric generator having a field winding, an exciter generator having a field winding and connected to supply energy to the main generator field winding, means for governing the output voltage of the main generator comprising, in combination, a plurality of automatic rheostatic devices each comprising a resistor, a plurality of contact members connected to separate points along said resistor, stop means for limiting the movement of the contact members in one direction relative to the stop means in spaced relation relative to adjacent contact members, the relative movement of said contact members and said stop means being unrestricted in one direction, and electro-responsively controlled means including an energizing winding for effecting the relative movement of said contact members and said stop means in the unrestricted direction, certain of said rheostatic devices having their resistors connected in the exciter generator field winding circuit, and one of said rheostatic devices having its resistor connected for controlling the energization of the energizing windings of the other rheostatic devices, the energizing winding of the last named rheostatic device being connected to be energized in accordance with the voltage of the main generator, a plurality of feedback transformers including in the circuit for energizing the last named rheostatic device and energized, respectively, in accordance with the voltage applied to the windings of the other rheostatic devices, the voltage applied to the exciter generator field winding, and the voltage applied to the main generator field winding.

5. In a regulating system, an electric generator having a field winding, means for governing the output voltage of the generator comprising, in combination, a plurality of automatic rheostatic devices each including a resistor, a plurality of contact members connected to separate points along said resistor, stop means for spacing the contact members relative to adjacent contact members when engaged thereby, the relative movement of said contact members and said stop means being unrestricted in one direction, and electro-responsively controlled means including an energizing winding for effecting the relative movement of said contact members and said stop members in the unrestricted direction, and one of said rheostatic devices having its resistor connected for controlling the energization of the energizing windings of the other rheostatic devices and its energizing winding connected to be energized in accordance with the voltage of the generator, and two feedback transformers included in the circuit for energizing the last named rheostatic device and energized, respectively, in accordance with the voltage applied to the windings of the other rheostatic devices and the voltage across the generator field winding.

6. In a regulator system, means for adjusting a characteristic of an electric circuit comprising, in combination, a plurality of automatic rheostatic devices each including a resistor, a plurality of contact members connected to separate points along said resistor, stop means for spacing the contact members relative to adjacent contact members when actuated to the limit of movement in one direction relative to the stop means, the relative movement of said contact members and said stop means being unrestricted in one direction, and electro-responsively controlled means including an energizing winding for effecting the relative movement of said contact members and said stop members in the unrestricted direction, certain of said automatic rheostatic devices being arranged to operate as power amplifying devices for controlling an electric circuit, a source of energy for supplying the energizing windings thereof, and one of said automatic rheostatic devices being connected as a pilot element having its winding energized in accordance with the regulated quantity to vary the energization of the windings of said amplifying devices over a wide range upon slight variations in the regulated quantity.

7. In a regulator system, means for adjusting a characteristic of an electric circuit comprising, in combination, a plurality of power amplifying rheostatic devices each comprising a resistor, a plurality of contact members connected to separate points along said resistor, stop means for spacing the contact members relative to adjacent contact members, the relative movement between said contact members and said stop means being unrestricted in one direction, the electro-responsively controlled means including an energizing winding for effecting the relative movements of said contact members and said stop means in the unrestricted direction, a source of energy for said windings and impedance means connected between said source and said windings, and a pilot rheostatic device structurally similar to said power amplifying rheostatic devices and having its associated resistor connected in parallel circuit relation to the energizing windings of said power amplifying rheostatic devices and its energizing winding connected to be energized in accordance with a quantity to be regulated.

CLINTON R. HANNA.